United States Patent
Magyar et al.

(10) Patent No.: US 12,341,453 B2
(45) Date of Patent: Jun. 24, 2025

(54) SYSTEMS AND METHODS FOR REGULATING ELECTRIC MOTOR OUTPUT

(71) Applicant: Regal Beloit America, Inc., Beloit, WI (US)

(72) Inventors: Justin Michael Magyar, Troy, OH (US); Howard Richardson, Tipp City, OH (US); Nathan Eric Snell, Tipp City, OH (US)

(73) Assignee: Regal Beloit America, Inc., Milwaukee, WI (US)

( * ) Notice: Subject to any disclaimer, the term of this patent is extended or adjusted under 35 U.S.C. 154(b) by 194 days.

(21) Appl. No.: 17/859,949

(22) Filed: Jul. 7, 2022

(65) Prior Publication Data

US 2024/0014760 A1 Jan. 11, 2024

(51) Int. Cl.
*H02P 23/26* (2016.01)

(52) U.S. Cl.
CPC .................. *H02P 23/26* (2016.02)

(58) Field of Classification Search
CPC ...... H02P 1/04; H02P 6/06; H02P 8/14; H02P 21/22; H02P 23/14; H02P 23/26; H02P 29/02; H02P 29/40; H02P 2205/01
See application file for complete search history.

(56) References Cited

U.S. PATENT DOCUMENTS

| | | |
|---|---|---|
| 6,074,170 A | 6/2000 | Bert et al. |
| 6,695,589 B1 | 2/2004 | Dougan et al. |
| 6,781,331 B2 | 8/2004 | Mokri et al. |
| 7,303,241 B2 | 12/2007 | Kokubo |
| 9,712,088 B2 | 7/2017 | Kang et al. |
| 2016/0211785 A1 | 7/2016 | Green et al. |
| 2021/0317834 A1* | 10/2021 | Lee ..................... F04D 29/2238 |

FOREIGN PATENT DOCUMENTS

| | | | | |
|---|---|---|---|---|
| CN | 111894840 A | * | 11/2020 | ............. F04B 49/06 |
| KR | 20140108772 A | * | 9/2014 | ................ H02P 3/08 |

OTHER PUBLICATIONS

Eng-KR-20140108772-A (Year: 2014).*
Translation of CN111894840 (Year: 2020).*

* cited by examiner

*Primary Examiner* — Said Bouziane
(74) *Attorney, Agent, or Firm* — Armstrong Teasdale LLP

(57) ABSTRACT

An electric motor for a pump includes an AC line-in node for receiving AC power supplied to the electric motor. The electric motor includes a current sensor coupled to the AC line-in node and measures current supplied to the electric motor. The electric motor includes a motor controller configured to convert the AC power supplied to a variable frequency variable voltage power for driving the electric motor at a normal output value. The motor controller includes a microcontroller and an inverter. The microcontroller is coupled to the current sensor and receives a measured value of the current supplied to the electric motor, determines the measured value is above a threshold, and transmits a control signal representing a reduced output value. The inverter receives the control signal and generates the variable frequency variable voltage power to reduce output from the electric motor according to the reduced output value.

22 Claims, 5 Drawing Sheets

SYSTEMS AND METHODS FOR REGULATING ELECTRIC MOTOR OUTPUT

FIELD

The field of the disclosure relates generally to control of electric motors and, more specifically, a regulating electric motor torque or speed output for electric motors without power factor correction.

BACKGROUND

Electric motors utilize electric power to drive a mechanical load, such as, for example, a pool or spa pump, a fan or blower, or a propulsion system, among other applications. Power factor is a measure of how efficiently electric power in an alternating current (AC) power system is transferred to a load (or the reverse when the load is generating power). Power factor for an electric motor is a ratio of real power delivered to the load to the apparent power consumed by the electric motor, and ranges from −1 to 1, where a power factor of 1 indicates a perfectly efficient transfer of real power to the load, real power representing the work performing power. A power factor below 1 indicates the voltage and current supplied to the electric motor are out of phase, which reduces the real power available to the load. In other words, for a given amount of work to be performed by the load, an increasing amount of apparent power (i.e., more current) must be delivered to the electric motor as power factor declines. Consequently, equipment (i.e., loads) having lower power factors are less efficient.

Some electrical systems include power factor correction features that improve the power factor for the equipment in which they are installed. Some electric motors include active or passive power factor correction. However, inclusion of power factor correction increases cost and complexity of the equipment. For this reason, at least some electric motors do not include power factor correction, resulting in unregulated variation in power factor from installation to installation.

BRIEF DESCRIPTION

In one aspect, an electric motor for a pump is provided. The electric motor includes an AC line-in node for receiving AC power supplied to the electric motor. The electric motor includes a current sensor coupled to the AC line-in node and measures current supplied to the electric motor. The electric motor includes a motor controller configured to convert the AC power supplied to a variable frequency variable voltage power for driving the electric motor at a normal output value. The motor controller includes a microcontroller and an inverter. The microcontroller is coupled to the current sensor and receives a measured value of the current supplied to the electric motor, determines the measured value is above a threshold, and transmits a control signal representing a reduced output value. The inverter receives the control signal and generates the variable frequency variable voltage power to reduce output from the electric motor according to the reduced output value.

In another aspect, a motor controller for an electric motor is provided. The motor controller includes a power circuit configured to receive an AC line-in power and convert to a direct current (DC) voltage. The motor controller includes a microcontroller configured to receive a measured value from a current sensor coupled to the power circuit, determine the measured value is above a threshold, and transmit, in response to determining the measured value is above the threshold, a control signal including a reduced output value for the electric motor. The motor controller includes an inverter coupled to the power circuit and the microcontroller. The inverter is configured to receive the DC voltage and generate a variable frequency variable voltage power for driving the electric motor at a normal output value and reduce output of the electric motor in response to the reduced output value.

In another aspect, a method of controlling an electric motor for a pump is provided. The method, embodied in a motor controller or, more specifically, a microcontroller, includes controlling an inverter to drive the electric motor at a normal output value. The method includes receiving a measured value for an AC line-in current supplied to the electric motor. The method includes determining the measured value exceeds a threshold. The method includes controlling the inverter to drive the electric motor, in response to the determining, at a reduced output value.

DETAILED DESCRIPTION

Figure 1:
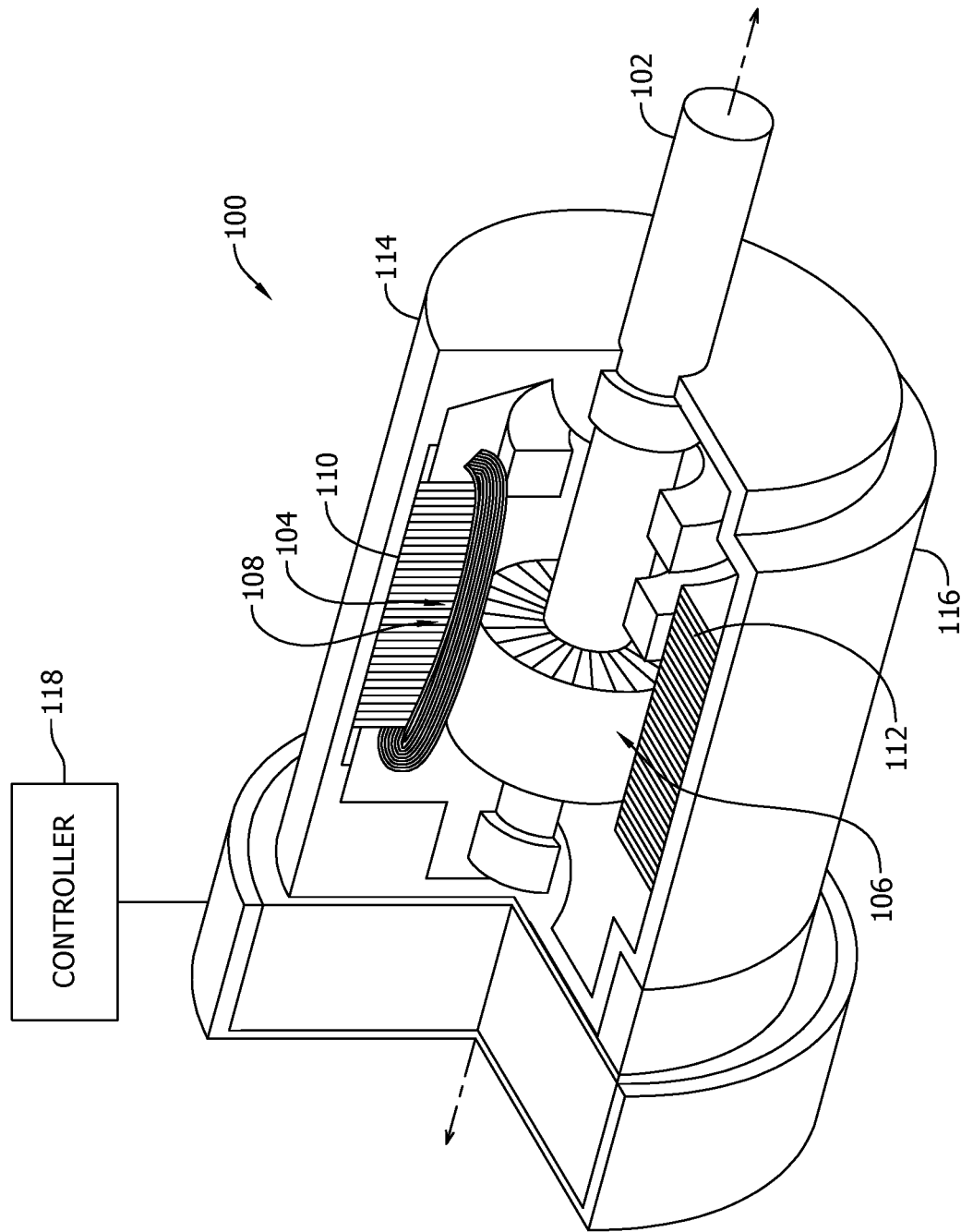
FIG. 1 is a partial cross-sectional view of an exemplary electric machine, such as an electric motor.

The disclosed systems and methods regulate electric motor output and, more specifically electric motor torque or speed output. The disclosed systems and methods regulate output for electric motors without power factor correction. A conventional electric motor, for example, is commanded to operate at a set point speed or torque, and the electric motor operates in a closed-loop fashion to achieve that set point, or target, speed or torque and to deliver real power to a mechanical load. Generally, for high load levels, the electric motor draws more electric power, i.e., greater current, to deliver the target speed or torque; and for low load levels, the electric motor draws less electric power, i.e., less current, to deliver the target speed or torque. Electric motors without power factor correction may experience variations in power factor based on a particular installation or power source to which the electric motor is connected, including reductions in power factor. When the power factor is reduced, for a given load, the current demanded by the electric motor increases to achieve the same speed or torque output; and potentially increases beyond a threshold for a circuit breaker or other protection device in the circuit supplying current to the electric motor. Consequently, variations in power factor may result in over-current conditions that trip circuit breakers and disable the electric motor.

The disclosed systems and methods monitor current (i.e., AC) supplied to the electric motor and regulates the motor output, e.g., limits the torque or speed output, to prevent the current drawn by the electric motor from exceeding protection thresholds, such as those for circuit breakers. The disclosed regulation, or "derating," of the electric motor output detects increased power demands by the electric motor resulting from a reduced power factor or power source variations, or other contributing conditions, and limits output speed or output torque of the electric motor to regulate the current drawn by the electric motor below the protection threshold. The disclosed systems include a current sensor, such as a current transformer, hall effect sensor, or other suitable current sensor or sensing circuit. The current sensor provides a measurement to a controller, e.g., a motor controller, system controller, or other remote control system. The controller or, more specifically, a processor or microcontroller for the controller then regulates speed or torque output from the electric motor based on the measurement. For example, if the measured current exceeds a threshold, a speed or torque output limit is applied, thereby "derating" the electric motor.

In certain embodiments, the threshold for initiating derating of the electric motor is programmable, or configurable, in the software or firmware of the motor controller. The threshold value, corresponding to a current limit, may be received from a system controller, from a user interface, or may be programmed at installation, calibration, or at manufacture. Likewise, the threshold may be adjusted in a similar manner to accommodate changes to the electrical system, such as, for example, new or additional motors, changes in controllers or sensors, changes in circuit protection devices, or the addition of power factor correction circuits, equipment, or devices.

FIG. 1 is a partial cross-sectional view of an exemplary electric machine 100. The electric machine 100 may be an electric motor or an electric generator. The electric motor may be used to power any mechanism, or load, for example, a pump, a cyclic drive, a compressor, a vehicle or other propulsion system, a fan, or a blower.

The electric machine 100 typically includes a centrally located motor shaft 102 that rotates relative to electric machine 100. Electrical energy, i.e., a voltage, is applied to coils 104 within electric machine 100. Coils 104 conduct an electric current to generate an electromagnetic field that cooperates with an electromagnetic field in rotor 106 mounted to the motor shaft 102. Coils 104 initiate relative motion between shaft 102 and electric machine 100 to transfer the power from coils 104 to shaft 102.

A stationary assembly 108, also referred to as a stator, includes stator core 110 and coils 104, or windings, positioned around portions of stator core 110. Energy is applied to coils 104 to initiate the relative motion that transfers the power to shaft 102. Coils 104 are formed by winding wire (not shown), typically copper, aluminum, or a combination thereof, about a central core to form the winding or coil. An electric current is directed through coils 104 that induces a magnetic field. The magnetic field induces the relative motion to transfer the power to shaft 102. The stator core 110 typically includes a solid core or a plurality of stator core laminations 112 that define stator teeth (not shown) around which coils 104 are wound.

Electric machine 100 generally includes a housing 114 having an inner wall or surface that defines a motor cavity therein. The housing 114 may include a plurality of components and may be made of a suitable durable material, for example a metal, a polymer, or a composite. The housing 114 may, as shown, include a cylindrical shell 116 and opposed end caps (not shown).

Housing 114 of the motor may have any suitable shape. One common shape of a motor housing is that of a cylindrical solid, having a generally cylindrical cross section. The shaft on a motor with such a shape generally extends from an end of the motor.

The electric machine 100 may have any suitable size and shape, and may be, for example, an induction motor, a permanent-split capacitor (PSC) motor, an electronically commutated motor (ECM) motor, or a switched reluctance motor. The electric machine 100 may, as shown, be a radial flux motor or may be an axial flux motor. The housing 114 may include protrusions, for example fins (not shown), for dissipation of heat. The electric machine 100 may also include a fan (not shown) positioned within housing 114. The electric machine 100 may be electronically controlled, particularly if the motor is an ECM motor, by, for example, a motor controller 118. The motor controller 118 may be internally or externally mounted to the electric machine 100. Alternatively, the motor controller 118 may be spaced from the electric machine 100 and may, for example, be a part of a system controller (not shown).

Figure 2:
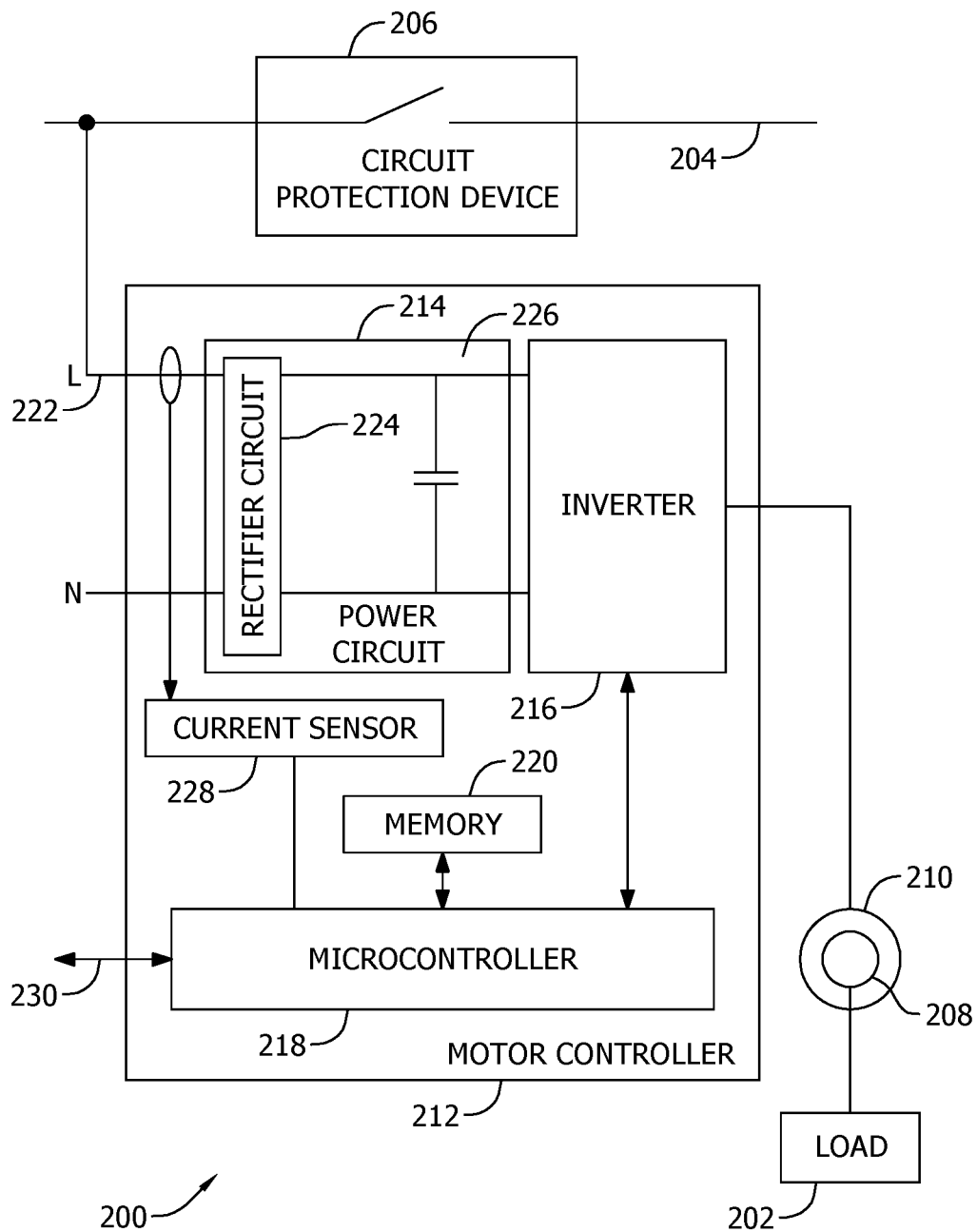
FIG. 2 is a diagram of an electric motor for driving a load, such as a pump.

FIG. 2 is a diagram of an electric motor 200 for driving a load 202, such as a pump commonly used, for example, in pools and spas. As such, electric motor 200 is typically connected to line frequency alternating current (AC) power, which is typically 50 Hertz or 60 Hertz and can be supplied at various line voltages, including, for example, 100 Volt, 110 Volt, 200 Volt, or 220 Volt among others. Line frequency AC power is generally supplied as one or more phases on one or more corresponding circuits 204. Each circuit 204 supplying line frequency AC power is typically protected by one or more circuit protection devices 206. Circuit protection device 206 may include a circuit breaker, fuse, switch gear, or other suitable device for limiting current conducted through circuit 204. For example, a typical outdoor residential circuit is protected by one or more 20 ampere circuit breaker. Equipment may alternatively be protected by one or more 30 ampere, 40 ampere, 50 ampere, 60 ampere, or greater circuit breakers.

Electric motor 200 includes a rotor assembly 208 that rotates relative to a stator assembly 210, and is mechanically coupled to load 202, such as a pump. Electric motor 200 includes a motor controller 212 that regulates power to, or operates, rotor assembly 208 and stator assembly 210 to drive load 202. Motor controller 212 includes a power circuit 214, an inverter 216, or "drive," a microcontroller 218 or other processor, and memory 220.

Power circuit 214 receives line-frequency AC power at an AC line-in node 222 for powering the various components of electric motor 200. Power circuit 214 includes a rectifier circuit 224 that rectifies, or converts, line frequency AC power to a direct current (DC) voltage. The DC voltage is supplied to a DC bus 226 that delivers DC voltage to inverter 216 and other components, such as microcontroller 218 and memory 220.

Inverter 216 includes an array of semiconductor switches controlled to switch the DC voltage supplied by DC bus 226 in a manner to produce one or more phases of a variable frequency variable voltage current for supplying to windings of stator assembly 210. Inverter 216 is controlled by microcontroller 218.

Microcontroller 218 is configured to communicate with memory 220 and inverter 216. Microcontroller 218 provides control signals to inverter 216, and inverter 216, in response, supplies current to windings of stator assembly 210 in the form of a variable frequency variable voltage signal. Accordingly, microcontroller 218 commands a motor output, i.e., a speed or torque output, at which motor 200 operates. In some embodiments, microcontroller 218 is configured to communicate with a user device, for example, through a wired or wireless communication channel, such as a serial interface or a Wi-Fi or Bluetooth connection. In such embodiments, users may view status data and control electric motor 200 via, for example, a mobile or web application. Similarly, microcontroller 218 may be configured to communicate with a system controller or other remote device through a wired or wireless communication channel 230. Such communication may include transmission of a system control signal from, e.g., the system controller, to microcontroller 218, including a commanded motor output (Q), such as a commanded speed or a commanded torque. Alternatively, the system control signal may include an operating mode, e.g., high or low, from which microcontroller 218 can determine an appropriate commanded motor output (Q), which may be stored in memory 220 as a discreet value, as a table of values, or as algorithm or formula, each of which representing an operating profile for electric motor 200.

Microcontroller 218 executes a control loop to determine a set point for motor output, i.e., speed or torque output, for electric motor 200. The control loop generally operates in a closed loop based on a commanded motor output (Q) and a measured parameter feedback, the feedback typically including either measured speed (N) output or measured torque (T) output from electric motor 200. Microcontroller 218 executes the control loop iteratively to converge motor output toward the set point for motor output, e.g., using a PI, PID, or other control logic. Microcontroller 218 may additionally use an operating profile to translate the commanded motor output (Q) to the set point. The operating profile may include a table of values, i.e., a lookup table, discreet values, or an algorithm or formula stored in memory 220. In certain embodiments, for example, those using an algorithm or formula, the operating profile may use one or more coefficients or constants (A) determined at manufacture, at calibration, or at installation, and written to memory 220.

Figure 3:
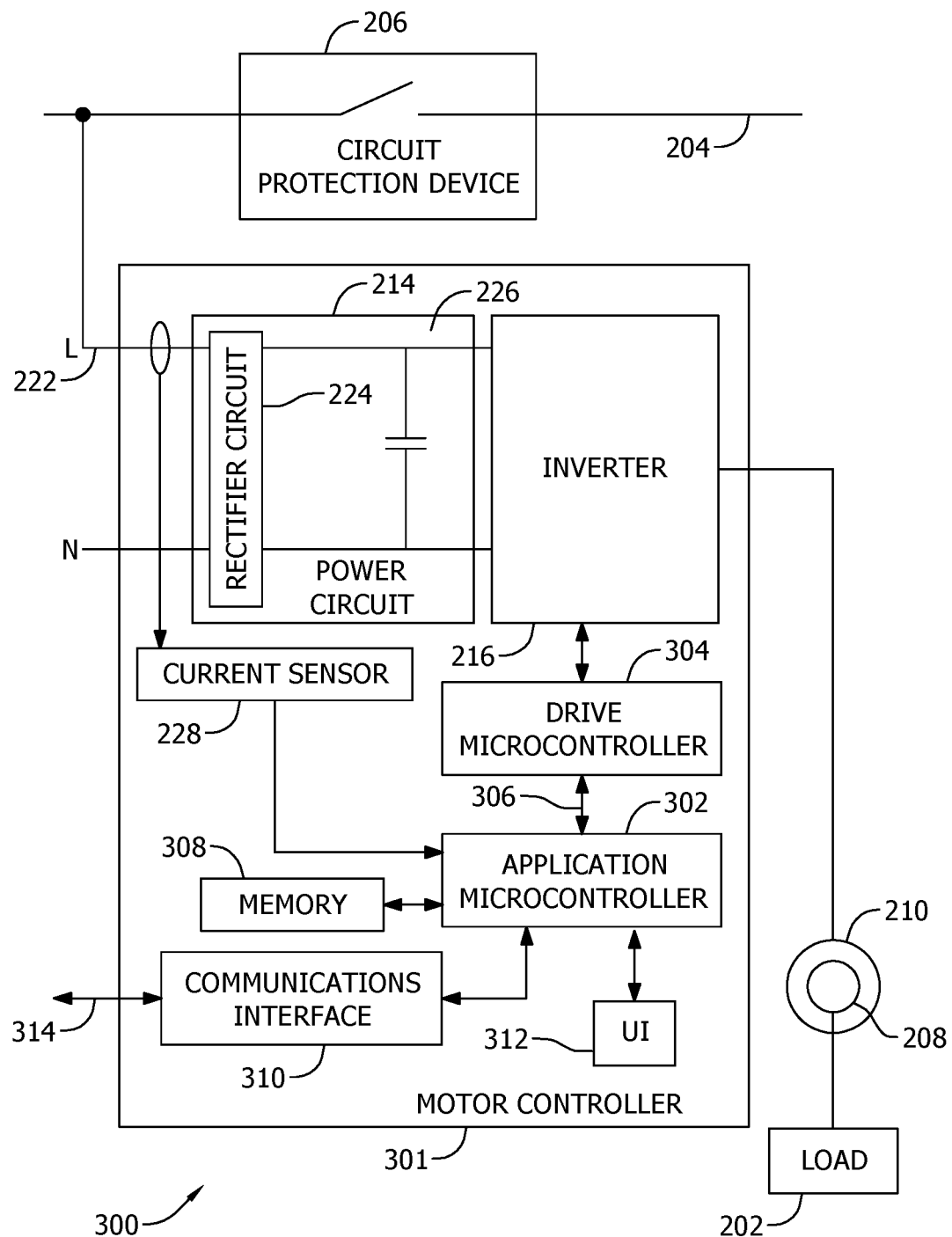
FIG. 3 is a diagram of another electric motor for driving a load, such as a pump.

FIG. 3 is a diagram of another electric motor 300 for driving load 202, such as a pump commonly used, for example, in pools and spas. Electric motor 300 is similar to electric motor 200 shown in FIG. 2, but divides processing functionality within a motor controller 301 between a first microcontroller, or "application microcontroller" 302, and a second microcontroller, or "drive microcontroller" 304. Electric motor 300 otherwise includes common components with electric motor 200, including power circuit 214, inverter 216, rotor assembly 208, stator assembly 210, and current sensor 228. Likewise, electric motor 300 is supplied AC line-in power via circuit 204 and circuit protection device 206, and drives load 202.

Application microcontroller 302 and drive microcontroller 304 may be disposed in close proximity to each other, e.g., within a single enclosure within or attached to electric motor 300, or within separate enclosures within or attached to electric motor 300. Application microcontroller 302 and drive microcontroller 304 are communicatively coupled via a channel 306 including a wired or wireless connection. Application microcontroller 302 is further communicatively coupled to memory 308, a communications interface 310, a user interface (UI) 312, and current sensor 228. Drive microcontroller 304 is coupled to inverter 216. Generally, application microcontroller 302 is configured, or programmed, to perform a variety of input-level processing, such as providing UI 312, receiving and processing user input from UI 312, and translating user input into system-level commands. Drive microcontroller 304 is configured to perform a variety of system-level processing, such as receiving system-level commands from application microcontroller 302, controlling inverter 216 to drive electric motor 300 in response to system-level commands, and performing safety and status checks, among others.

Communication interface 310 may include any suitable wireless or wired communication channel 314, such as a transceiver for Bluetooth, WiFi, NFC, or other RF communications, or for a serial or parallel channel, CAN bus, or other suitable wired channel. Communication interface 310 enables communication with a system controller or other remote control system or user device. UI 312 may include a display, buttons, switches, touch screen, or other physical interface for receiving user input.

Application microcontroller 302 is configured to communicate with current sensor 228, communications interface 310, and UI 312 to produce operating commands for drive microcontroller 304, such as "run at speed X" or "run at torque Y." Drive microcontroller 304 processes the operating commands and provides control signals to inverter 216, and inverter 216, in response, supplies current to windings of stator assembly 210 in the form of a variable frequency variable voltage signal.

In some embodiments, application microcontroller 302 is configured to communicate with a user device via communications interface 310, for example, through a wired or wireless communication channel, such as a serial interface or a Wi-Fi or Bluetooth connection. In such embodiments, users may view status data and control electric motor 300 via, for example, a mobile or web application. Similarly, application microcontroller 302 may be configured to communicate with a system controller or other remote device through a wired or wireless communication channel 314. Such communication may include transmission of a system control signal from, e.g., the system controller, to application microcontroller 302, including a commanded motor output (Q), such as a commanded speed or a commanded torque. Alternatively, the system control signal may include an operating mode, e.g., high or low, from which application microcontroller 302 can determine an appropriate commanded motor output (Q), which may be stored in memory 308 as a discreet value, as a table of values, or as algorithm or formula, each of which representing an operating profile for electric motor 300.

Drive microcontroller 304 executes a control loop to determine a set point for motor output, i.e., speed or torque output, for electric motor 300. The control loop generally operates in a closed loop based on a commanded motor output (Q) and a measured parameter feedback, the feedback typically including either measured speed (N) output or measured torque (T) output from electric motor 300. Drive microcontroller 304 executes the control loop iteratively to converge motor output toward the set point for motor output, e.g., using a PI or PID control logic. Drive microcontroller 304 may additionally use an operating profile to translate the commanded motor output (Q) to the set point. The operating profile may include a table of values, i.e., a lookup table, discreet values, or an algorithm or formula stored in memory 308. In certain embodiments, for example, those using an algorithm or formula, the operating profile may use one or more coefficients or constants (A) determined at manufacture, at calibration, or at installation, and written to memory 308.

Figure 4:
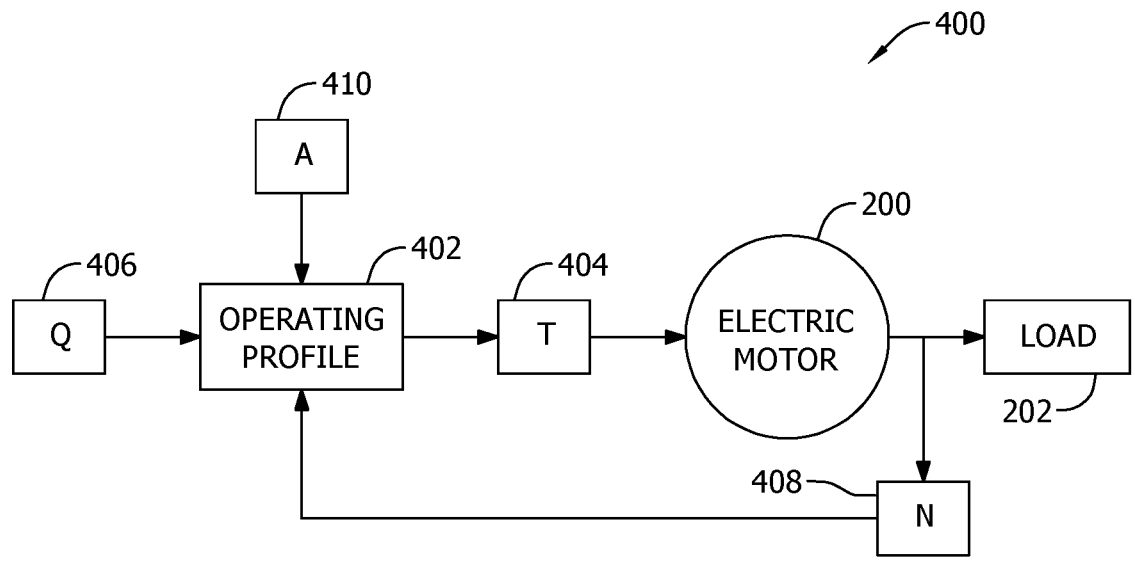
FIG. 4 is a schematic diagram of an example control loop for a torque-controlled electric motor.

FIG. 4 is a schematic diagram of one embodiment of a control loop 400 for use in controlling a torque-controlled electric motor, such as electric motor 200 or electric motor 300. Although FIG. 4 illustrates electric motor 200 shown in FIG. 2, control loop 400 is equally applicable to electric motor 300 shown in FIG. 3. Control loop 400 may be embodied, for example, in motor controller 212 and microcontroller 218, motor controller 301, application microcontroller 302, and drive microcontroller 304, or another processor in a system controller (not shown) or other remote device, and illustrates control of electric motor 200 or 300 by execution of an operating profile 402 to compute a torque set point 404. Operating profile 402 uses a commanded motor output (Q) 406 and measured speed (N) 408, and computes torque set point 404. Commanded motor output 406 may be a value received from a system controller or other remote system in a system control signal. Operating profile 402 includes at least a control logic, such as a PI or PID algorithm, for computing torque set point 404, and the algorithm may use a set of coefficients or constants (A) 410. Constants 410 may be programmed into operating profile 402 and written to memory 220 or 308, or may be stored in memory 220 or 308 independent of operating profile 402 and accessed when control loop 400 is executed. Operating profile 402 may also include a table of values, or look up table, or an algorithm or formula for translating commanded motor output 406 to torque set point 404.

Figure 5:
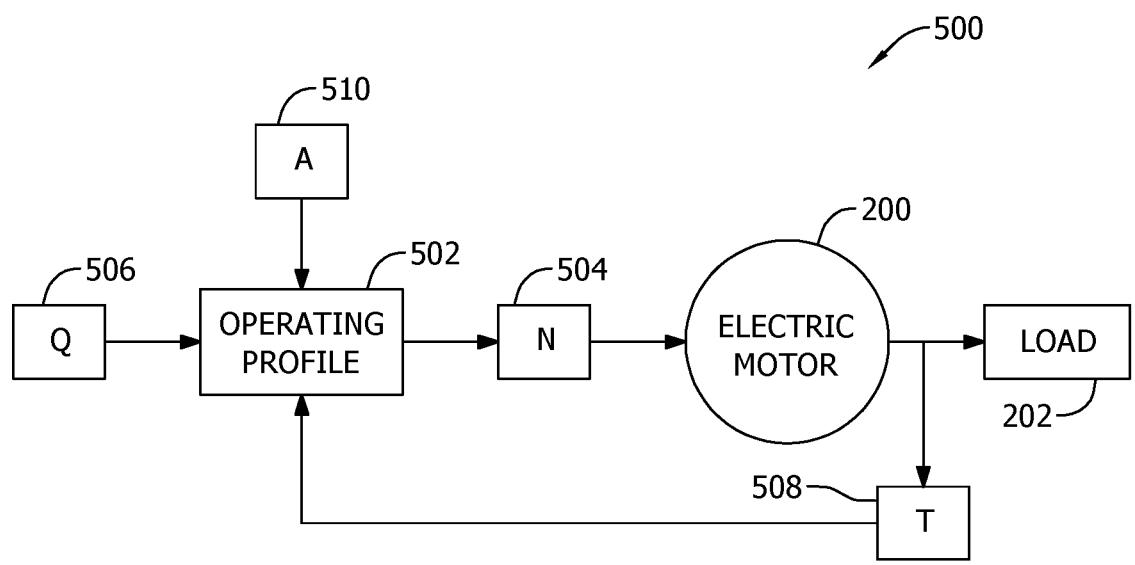
FIG. 5 is a schematic diagram of an example control loop for a speed-controlled electric motor.

FIG. 5 is a schematic diagram of one embodiment of a control loop 500 for use in controlling a speed-controlled electric motor, such as electric motor 200 or electric motor 300. Although FIG. 5 illustrates electric motor 200 shown in FIG. 2, control loop 500 is equally applicable to electric motor 300 shown in FIG. 3. Control loop 500 may be embodied, for example, in motor controller 212 and microcontroller 218, motor controller 301, application microcontroller 302, drive microcontroller 304, or another processor in a system controller (not shown) or other remote device, and illustrates control of electric motor 200 or 300 by execution of an operating profile 502 to compute a speed set point 504. Operating profile 502 receives a commanded motor output (Q) 506 and measured torque (T) 508, and computes speed set point (N) 504. Commanded motor output 506 may be a value received from a system controller or other remote system in a system control signal. Operating profile 502 includes at least a control logic, such as a PI or PID algorithm, for computing speed set point 504, and the algorithm may use a set of coefficients or constants (A) 510. Constants 510 may be programmed into operating profile 502 and written to memory 220 or 308 or may be stored in memory 220 or 308 independent of operating profile 502 and accessed when control loop 500 is executed. Operating profile 502 may also include a table of values, or look up table, or an algorithm or formula for translating commanded motor output 506 to speed set point 504.

Referring again to FIGS. 2 and 3, electric motors 200 and 300 each include a current sensor 228 coupled to AC line-in node 222 and configured to measure current supplied to power circuit 214 for driving electric motor 200 or 300. For electric motor 200, current sensor 228 is communicatively coupled to microcontroller 218 and transmits a measured current value to microcontroller 218 using a digital or analog input channel. For electric motor 300, current sensor 228 is communicatively coupled to application microcontroller 302 and transmits a measured current value to application microcontroller 302 using a digital or analog input channel. Current sensor 228 may include a current transformer, a hall effect sensor, or other suitable current sensing device or circuit. Current sensor 228 may be incorporated within motor controller 212 or 301, or provided independent of motor controller 212 or 301. Likewise, when provided independent of motor controller 212 or 301, current sensor 228 may be disposed within a motor housing or external to the motor housing, e.g., such as housing 114 of the electric machine shown in FIG. 1.

Notably, motor controller 212 and motor controller 301 do not include a power factor correction feature. Consequently, depending on a given application of electric motor 200 or 300, the power factor experienced by electric motor 200 or 300 can vary, sometimes significantly. For a given value of load 202, when the power factor experienced by electric motor 200 or 300 decreases, the current demanded by electric motor 200 or 300 increases. The increased current demand manifests as an increased current draw at AC line-in node 222 and is therefore observable by current sensor 228 (although such an increase cannot be distinguished from other causes for an increased current demand). Under certain circumstances, the increased current draw at AC line-in node 222 may result in an over-current condition that could trigger circuit protection device 206, e.g., trip a circuit breaker.

Referring to FIGS. 2, 4, and 5, when the increased current draw at AC line-in node 222 is observed by current sensor 228 and relayed to microcontroller 218, microcontroller 218 responds by regulating motor output to avoid an over-current condition. More specifically, microcontroller 218 limits motor output, i.e., motor speed or motor torque, a practice sometimes referred to as "derating." Microcontroller 218 receives a measured value of current conducted through AC line-in node 222 and compares the measured value to a threshold. If the measured value is greater than the threshold, then microcontroller 218 reduces motor output. The threshold may be programmed into memory 220 or coded into the executable instructions programmed into memory 220 or microcontroller 218. The threshold may be configurable by a system controller or other remote system, or may be configurable by a user via a user interface. Accordingly, the threshold may be set at manufacture, calibration, installation, or periodically during use via a user interface, system controller, or other remote system.

A reduced motor output can be achieved by reducing a commanded motor output (Q) 406 or 506 received from a user interface (not shown) or from a system controller or other remote system (not shown), or by directly reducing the set point for motor output, i.e., the torque set point 404 or the speed set point 504, shown in control loops 400 and 500 in FIGS. 4 and 5, respectively.

In one embodiment, when microcontroller 218 determines the measured value (i.e., measured current supplied to electric motor 200) exceeds the threshold, microcontroller 218 in real time reduces commanded motor output (Q) 406 or 506 from an original value used under normal conditions, i.e., a normal commanded output (Q1), to a reduced value (Q2). Microcontroller 218 may determine the reduced value by executing an algorithm or formula, or by a lookup table with discrete values stored in memory 220. The reduced value (Q2) is then provided, for example, to control loop 400 or 500 for computing a corresponding set point that is also reduced relative to a set point that would be computed for the normal commanded output (Q1). Electric motor 200 is then driven at the reduced setpoint.

In one embodiment, when a first current threshold is exceeded, microcontroller 218 reduces the commanded output from Q1 to Q2, and begins incrementing the commanded output in small steps from Q2 toward Q1 to converge on a final commanded output Q3 that is between Q2 and Q1. The increments, for example, may be 25 RPM, 50 RPM, 75 RPM or any other suitable increment for electric motor 200 using a speed control. Alternatively, the increments may be in units of torque for electric motor 200 using a torque control. As another alternative, the increment in motor output may be a percentage of the difference between the original motor output Q1 and the reduced motor output Q2. The final commanded output Q3 represents an optimized commanded output that results in a measured current that exceeds the first current threshold, but remains below a second current threshold that represents a maximum current allowed for electric motor 200. Conversely, the first current threshold represents a trigger for derating electric motor 200, or a threshold at which the disclosed regulation of motor output is initiated.

In another embodiment, when microcontroller 218 determines the measured value (i.e., measured current supplied to electric motor 200) exceeds the threshold, microcontroller 218 in real time within, for example, control loop 400 or 500, reduces the motor output setpoint (i.e., torque set point (T) 404 or speed set point (N) 504) from a normal motor output set point (T1 or N1) to a reduced motor output set point (T2 or N2). Microcontroller 218 may determine the reduced value of the set point by executing operating profile 402 or 502. Operating profile 402 or 502, in response to the measured value exceeding the threshold, modifies the control logic to yield a reduced set point value relative to what would otherwise be computed for a given commanded motor output (Q) 406 or 506.

Referring to FIGS. 3-5, when the increased current draw at AC line-in node 222 is observed by current sensor 228 and relayed to application microcontroller 302, application microcontroller 302 responds by regulating motor output to avoid an over-current condition. More specifically, application microcontroller 302 limits motor output, i.e., motor speed or motor torque, a practice sometimes referred to as "derating" by reducing a commanded speed or torque to be provided to drive microcontroller 304. Application microcontroller 302 receives a measured value of current conducted through AC line-in node 222 and compares the measured value to a threshold. If the measured value is greater than the threshold, then application microcontroller 302 reduces commanded motor output. The threshold may be programmed into memory 308 or coded into the executable instructions programmed into memory 308 or application microcontroller 302. The threshold may be configurable by a system controller or other remote system, or may be configurable by a user via a user interface. Accordingly, the threshold may be set at manufacture, calibration, installation, or periodically during use via a user interface, system controller, or other remote system.

A reduced motor output can be achieved by reducing a commanded motor output (Q) 406 or 506 provided by application microcontroller 302 to drive microcontroller 304 for initiating control loops 400 and 500 shown in FIGS. 4 and 5, respectively. In one embodiment, when application microcontroller 302 determines the measured value (i.e., measured current supplied to electric motor 300) exceeds the threshold, application microcontroller 302 in real time reduces commanded motor output (Q) 406 or 506 from an original value used under normal conditions, i.e., a normal commanded output (Q1), to a reduced value (Q2). Application microcontroller 302 may determine the reduced value by executing an algorithm or formula, or by a lookup table with discrete values stored in memory 308. The reduced value (Q2) is then provided to drive microcontroller 304 over channel 306, for example, to initiate execution of control loop 400 or 500 for computing a corresponding set point that is also reduced relative to a set point that would be computed for the normal commanded output (Q1). Electric motor 300 is then driven at the reduced setpoint.

In one embodiment, when a first current threshold is exceeded, application microcontroller 302 reduces the commanded output from Q1 to Q2, and begins incrementing the commanded output in small steps from Q2 toward Q1 to converge on a final commanded output Q3 that is between Q2 and Q1. The increments, for example, may be 25 RPM, 50 RPM, 75 RPM or any other suitable increment for electric motor 300 using a speed control. Alternatively, the increments may be in units of torque for electric motor 300 using a torque control. As another alternative, the increment in motor output may be a percentage of the difference between the original motor output Q1 and the reduced motor output Q2. The final commanded output Q3 represents an optimized commanded output that results in a measured current that exceeds the first current threshold, but remains below a second current threshold that represents a maximum current allowed for electric motor 300. Conversely, the first current threshold represents a trigger for derating electric motor 300, or a threshold at which the disclosed regulation of motor output is initiated.

Figure 6:
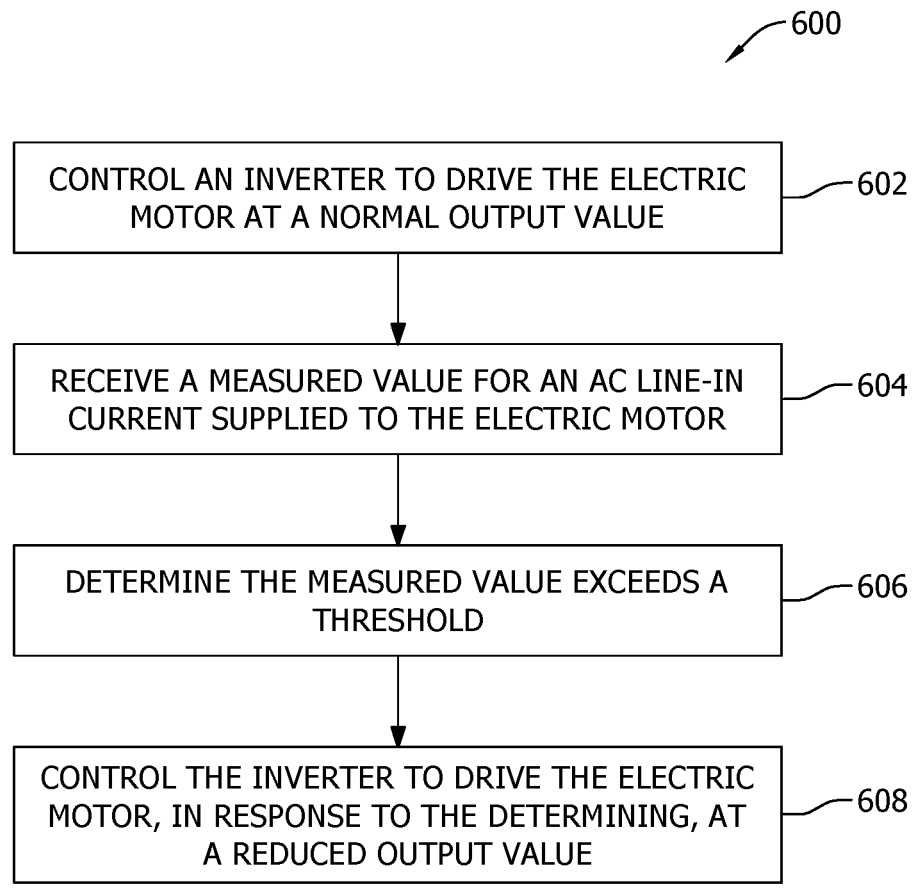
FIG. 6 is a flow diagram of an example method of controlling an electric motor for a pump using a microcontroller.

FIG. 6 is a flow diagram of an exemplary method 600 of controlling an electric motor, such as electric motor 200 or electric motor 300, for a pump. Method 600 may be embodied in a motor controller, such as motor controller 212 shown in FIG. 2, or a processor, such as microcontroller 218 shown in FIG. 2. Alternatively, method 600 may be embodied in motor controller 301 shown in FIG. 3, or one or more processors, such as application microcontroller 302 and drive microcontroller 304 shown in FIG. 3.

Referring to electric motor 200 shown in FIG. 2, microcontroller 218 receives a normal commanded output value from a user interface or a system controller. Microcontroller 218 controls 602 inverter 216 to drive electric motor 200 at a normal output value, i.e., a normal torque set point or a normal speed set point corresponding to the received normal commanded output value. The normal output value is computed based on the normal commanded output value and a measured feedback value, such as a measured speed or a measured torque.

Current sensor 228 measures AC line-in current supplied to electric motor 200 and transmits the measured value to microcontroller 218. Microcontroller 218 receives 604 the measured value for the AC line-in current. Microcontroller 218 determines 606 the measured value exceeds a threshold by comparing the measured value to a threshold value corresponding, for example, to a current limit for circuit protection device 206.

In response to determining 606 the measured value exceeds the threshold, microcontroller 218 controls 608 inverter 216 to drive electric motor 200 at a reduced output value, i.e., at a reduced torque set point or a reduced speed set point. Controlling 608 inverter 216 includes reducing the normal commanded output value and computing the reduced output value (i.e., a reduced torque setpoint or a reduced speed set point) based on a reduced commanded output value and a measured feedback value. Alternatively, controlling 608 inverter 216 includes computing the reduced output value (i.e., a reduced torque setpoint or a reduced speed set point) based on the normal commanded output value and a measured feedback value.

The methods and systems described herein may be implemented using computer programming or engineering techniques including computer software, firmware, hardware or any combination or subset thereof, wherein the technical effect may include at least one of: (a) regulating, i.e., reducing, motor output when AC line-in current exceeds a threshold; (b) improving flexibility and performance by enabling a configurable current threshold; (c) mitigating effects of low power factor by derating the electric motor; (d) reducing the cost of mitigating low power factor relative to common active or passive power factor correction features; and (e) improving stability of electrical system and the electrical circuits supplying AC power to the electric motor, and the stability of other electronic components in the system, by regulating motor output to avoid over current conditions.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Disjunctive language such as the phrase "at least one of X, Y, or Z," unless specifically stated otherwise, is generally understood within the context as used to state that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable and include any computer program stored in memory for execution by personal computers, workstations, clients, and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric motor for a pump, the electric motor comprising:
    an alternating current (AC) line-in node for receiving AC power supplied to the electric motor;
    a current sensor coupled to the AC line-in node and configured to measure current supplied to the electric motor; and
    a motor controller configured to convert the AC power supplied to a variable frequency variable voltage power for driving the electric motor at a normal output value, the motor controller comprising:
        a microcontroller coupled to the current sensor and configured to regulate the variable frequency variable voltage power without using an inductor or a transformer for power factor correction by:
            receiving a measured value of the current supplied to the electric motor, wherein a decrease in power factor of the electric motor from increased load results in an increase in the current supplied to the electric motor;
            determining the measured value is above a threshold; and
            transmitting a control signal representing a reduced output value; and
        an inverter configured to receive the control signal and generate the variable frequency variable voltage power to reduce output from the electric motor according to the reduced output value, thereby increasing the power factor of the electric motor.

2. The electric motor of claim 1, wherein the current sensor comprises a current transformer coupled to the AC line-in node.

3. The electric motor of claim 1, wherein the normal output value includes a first speed; and wherein the reduced output value includes a second speed that is less than the first speed.

4. The electric motor of claim 1, wherein the normal output value includes a first torque; and wherein the reduced output value includes a second torque that is less than the first torque.

5. The electric motor of claim 1, wherein the threshold is less than 30 amperes.

6. The electric motor of claim 1, wherein the threshold is less than 20 amperes.

7. The electric motor of claim 1, wherein the inverter is coupled to the microcontroller, and wherein the microcontroller is configured to transmit the control signal to the inverter.

8. The electric motor of claim 1, wherein the microcontroller is configured to receive a system control signal including a normal commanded output corresponding to the normal output value.

9. A motor controller for an electric motor, the motor controller comprising:
    a power circuit configured to receive alternating current (AC) line-in power and convert to a direct current (DC) voltage;
    a microcontroller configured to regulate variable frequency variable voltage power for driving an electric motor without using an inductor or a transformer for power factor correction by:
        receiving a measured value from a current sensor coupled to the power circuit, wherein a decrease in power factor of the electric motor from increased load results in an increase in the current supplied to the electric motor;
        determining the measured value is above a threshold; and
        transmitting, in response to determining the measured value is above the threshold, a control signal including a reduced output value for the electric motor; and
    an inverter coupled to the power circuit and the microcontroller, the inverter configured to:
        receive the DC voltage and generate a variable frequency variable voltage power for driving the electric motor at a normal output value; and
        reduce output of the electric motor in response to the reduced output value, thereby increasing the power factor of the electric motor.

10. The motor controller of claim 9 further comprising the current sensor.

11. The motor controller of claim 10, wherein the current sensor includes a current transformer.

12. The motor controller of claim 10, wherein the power circuit comprises:
    a rectifier circuit configured to convert AC line-in power to DC bus voltage; and
    a DC bus coupled to the rectifier circuit and configured to supply the DC bus voltage to the inverter.

13. The motor controller of claim 9, wherein the microcontroller is further configured to:
    receive a system control signal including a normal commanded output corresponding to the normal output value; and
    control the inverter to drive the electric motor at the normal output value.

14. The motor controller of claim 13, wherein the system control signal includes a normal commanded speed; and wherein the reduced output value includes a reduced speed value.

15. The motor controller of claim 13, wherein the system control signal includes a normal commanded torque; and wherein the reduced output value includes a reduced torque value.

16. A method of controlling an electric motor for a pump using a motor controller including a microcontroller configured to regulate variable frequency variable voltage power for driving the electric motor without using an inductor or a transformer for power factor correction, said method comprising:
    controlling an inverter to drive the electric motor at a normal output value;
    receiving a measured value for an alternating current (AC) line-in current supplied to the electric motor, wherein a decrease in power factor of the electric motor from increased load results in an increase in the current supplied to the electric motor;
    determining the measured value exceeds a threshold; and
    controlling the inverter to drive the electric motor, in response to the determining, at a reduced output value, thereby increasing the power factor of the electric motor.

17. The method of claim 16 further comprising receiving a normal commanded output value corresponding to the normal output value.

18. The method of claim 17, wherein controlling the inverter to drive the electric motor at the normal output value comprises computing the normal output value based on the normal commanded output value and a measured feedback value; and
    wherein controlling the inverter to drive the electric motor at the reduced output value comprises reducing the normal commanded output value and computing the reduced output value based on a reduced commanded output value and a measured feedback value.

19. The method of claim 17, wherein controlling the inverter to drive the electric motor at the normal output value comprises computing the normal output value based on the normal commanded output value and a measured feedback value; and wherein controlling the inverter to drive the electric motor at the reduced output value comprises computing the reduced output value based on the normal commanded output value and a measured feedback value.

20. The method of claim 16 further comprising measuring the AC line-in current supplied to the electric motor and transmitting the measured value to the microcontroller.

21. The method of claim 16, wherein determining the measured value exceeds the threshold comprises comparing the measured value to a threshold value corresponding to a current limit for a circuit protection device.

22. The method of claim 16, wherein determining the measured value exceeds the threshold comprises comparing the measured value to a threshold value corresponding to a current limit received from a system controller or a user interface.

\* \* \* \* \*